(12) United States Patent
Hosoe

(10) Patent No.: US 7,383,701 B2
(45) Date of Patent: *Jun. 10, 2008

(54) METHOD OF MAKEING A MOLDING DIE

(75) Inventor: Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,211

(22) Filed: Mar. 1, 2006

(65) Prior Publication Data

US 2006/0144093 A1 Jul. 6, 2006

Related U.S. Application Data

(62) Division of application No. 10/079,498, filed on Feb. 22, 2002, now abandoned.

(30) Foreign Application Priority Data

| Feb. 28, 2001 | (JP) | ............................. 2001-054182 |
| Feb. 28, 2001 | (JP) | ............................. 2001-054183 |
| Sep. 28, 2001 | (JP) | ............................. 2001-299657 |
| Sep. 28, 2001 | (JP) | ............................. 2001-299664 |

(51) Int. Cl.
*C03B 9/48* (2006.01)
(52) U.S. Cl. ...................... 65/374.12; 65/305
(58) Field of Classification Search ............. 65/374.12, 65/305, 323, 37, 39, 102; 249/135; 425/808; 264/1.32; 29/557
See application file for complete search history.

(56) References Cited

U.S. PATENT DOCUMENTS

| 5,171,348 | A | 12/1992 | Umetani et al. |
| 5,405,652 | A | 4/1995 | Kashiwagi et al. |
| 5,700,307 | A | 12/1997 | Kashiwagi et al. |
| 5,759,221 | A | 6/1998 | Kashiwagi et al. |
| 6,009,728 | A | 1/2000 | Kashiwagi et al. |
| 6,267,171 | B1 | 7/2001 | Onuki et al. |
| 6,521,058 | B1 | 2/2003 | Inoue et al. |
| 2003/0047248 | A1 | 3/2003 | Peker |

FOREIGN PATENT DOCUMENTS

| JP | 06-144850 | 5/1994 |
| JP | 06-183755 | 7/1994 |
| JP | 10-217257 | 8/1998 |
| JP | 2002-326231 | 11/2002 |
| JP | 2003-104736 | 4/2003 |

*Primary Examiner*—Carlos Lopez
(74) *Attorney, Agent, or Firm*—Finnegan, Henderson, Farabow, Garrett & Dunner, L.L.P.

(57) ABSTRACT

A molding die for an optical element, comprises a die base body formed by shaping an amorphous alloy having a super-cooled liquid phase, and a die face formed by applying a die face forming process onto a part of the die base body and used to form an optical surface of the optical element or a dimensional reference surface.

8 Claims, 6 Drawing Sheets

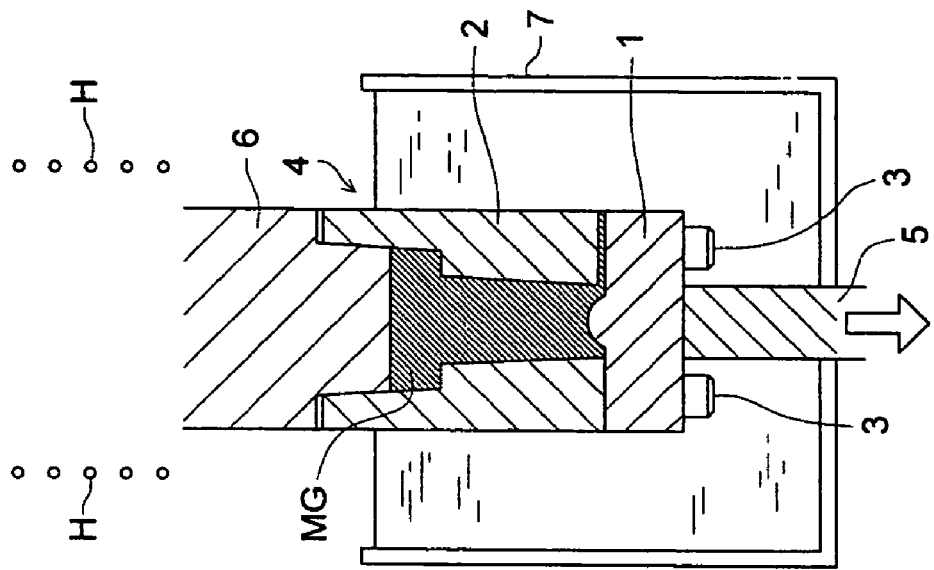
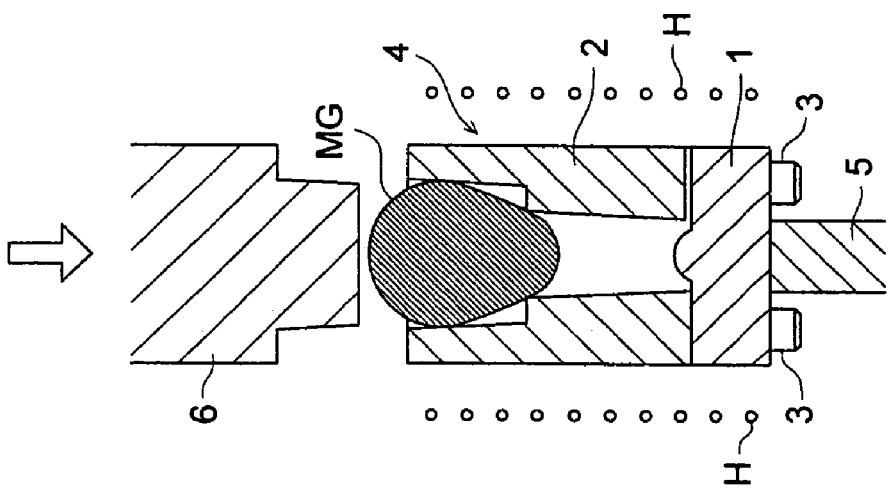
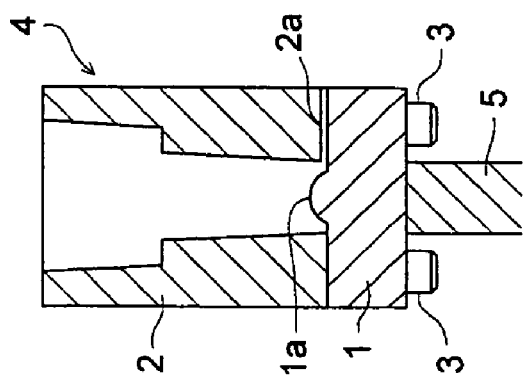

METHOD OF MAKEING A MOLDING DIE

CROSS-REFERENCE TO RELATED APPLICATIONS

This is a divisional of application Ser. No. 10/079,498, filed Feb. 22, 2002, now abandoned, and claims the foreign priority benefit of Japanese Application Nos. 2001-054182, filed Feb. 28, 2001; 2001-054183, filed Feb. 28, 2001; 2001-299657, filed Sep. 28, 2001; and 2001-299664, filed Sep. 28, 2001, all of which are incorporated herein by reference.

BACKGROUND OF THE INVENTION

The present invention relates to a molding die for an optical element, the optical element and its master die, and particularly to a molding die for the optical element by which a desired optical surface can be easily formed and the dimension and accuracy are increased, the optical element molded thereby, and a master die for molding it.

As a production method of the molding die for the optical element of a plastic optical element which is generally conducted, for example, a blank (primary processed goods) is made by a steel material or stainless steel, and by a chemical plating called electroless plating, an alloy composed of amorphous-like nickel and phosphorous is coated in the thickness of about 100 μm thereon, and this plating layer is cutting-processed by a diamond tool by a super-precision processing machine, and a highly accurate optical surface is obtained.

According to the method of the conventional technology, basically, because the part shape is formed by mechanical processing, the part accuracy is easily increased to near the motion accuracy of the processing machine. However, the conventional technology has the following disadvantages: mechanical processing and chemical processing are mixed in the production process, it is troublesome, it takes a long time to produce, it is, necessary to make a blank (primary processed goods), the plating processing is not necessarily stable, and the adherence strength of the plating layer fluctuates according to a deviation or stained condition of the composition of the blank, which generates a pinhole-like defect called a pit. Moreover, because the optical molding surface corresponding to the optical surface of the optical element must be formed within the thickness of the plating layer, there is no margin in the plating thickness when the optical molding surface is processed again, and sometimes the processing is impossible, and generally, the repeated use can not be conducted, and the molding die cost is high.

Further, when the optical molding surface requires much processing, the shape of the optical molding surface finished by cutting processing fluctuates slightly due to a change of a condition of cutting edge of a tool, processing condition, or processing environmental temperature. In this processing fluctuation of the optical molding surface, about 100 nm optical surface shape error is generally generated, and even when it is processed with very great care, about 50 nm error remains, which becomes is a processing accuracy limit.

Further, recently, an optical system in which the chromatic aberration is efficiently corrected by providing a diffraction groove on an optical surface, comes to practical use in an optical information recording field, and is produced in a large amount. As an optical material, plastic or glass is used, and in an ultra red optical system, a crystal material such as ZnSe is also used. An effective method when such an optical element is produced in a large amount, is molding, and at this time, a technology by which an optical molding surface having a fine diffraction groove of the molding die is efficiently produced with the high accuracy, is very important.

For example, when a fine pattern having an optical function such as a diffraction groove on the optical molding surface is formed by diamond cutting, the sharpness of the tool edge influences on the accuracy of the shape of the diffraction groove, and when it is transferred as the optical surface, it is well known as described in Japanese Tokkai No. 2001-195769 that it greatly influences the diffraction efficiency.

Accordingly, in order not to lower the diffraction efficiency of a diffraction ring band, it is necessary to sufficiently reduce the dimension of an edge of the tool is enough reduced. Accordingly, because the cutting resistance is concentrically burdened onto the small tool edge portion, it is necessary to reduce the cutting depth amount, and the greatly increasing the number of processing cycles until the whole of the optical molding surface is uniformly cut and removed. Further, in order to prevent the deterioration of the surface roughness of the optical molding surface by a small cutter mark, it is necessary to slow the feed speed, and increase the optical molding surface processing time per cycle. As a result, because the cutting length is increased, the wear of the tool edge is increased, and the tool exchange is frequent. That is, when the optical molding surface having a fine shape is processed by the conventional diamond cutting, the life of the tool becomes very short, and carbons in the diamond by the cutting is dispersed in the blank, thereby, the life of the tool is more reduced. Further, the time to process one optical molding surface is also increased, the processing efficiency is very lowered, and the productivity of the molding die is lowered, resulting in a sudden increase of the cost. Therefore, particularly when the optical molding surface having the fine shape on the surface is finished by the diamond cutting, a simple and short delivery date molding die production method is desired.

In addition, recently, it is tried that a new optical function is added to an optical element in such a manner that a fine structure having the dimension from several times of the wavelength to the dimension smaller than that, is provided on the optical surface. For example, the diffraction groove is provided on the surface of the molded lens having the aspheric optical surface, and the ordinary light converging function by the refraction and the positive dispersion which is generated as the side reaction at the time are cancelled by utilizing the negative dispersion in which the diffraction by the diffraction groove is large, and originally, a single lens optical element having the achromatic function which is impossible by only the refraction, is brought into practical use in a pick-up objective lens for a DVD/CD exchangeable optical disk. This is a lens in which the diffraction action by the diffraction groove having the dimension of several 10 times of the wavelength of the light transmitting the optical element is utilized, and such an area to process the diffraction action by the sufficiently larger structure than the wavelength is called a scalar area.

On the one hand, when a protrusion of the conical shape is formed in close formation on the surface of the optical surface at fine intervals which is one several numbers of the wavelength of the light transmitting the optical element, it is well known that the reflection suppression function of the light can be made to exhibit. That is, when a protrusion is formed at a fine interval, the refractive index change at the air interface when the light wave is incident on the optical element is changed not as in the conventional optical element in which it is instantaneously changed from 1 to the medium refractive index, but changed moderately, thereby, the reflection of the light can be suppressed. The surface on which such a protrusion is formed, is a fine structure called a moth eye, and when the finer structural bodies than the wavelength of the light are aligned at shorter periods than the wavelength, the individual structure does not even diffract, and it acts as an average refractive index on the light wave, and an area on which such an action is worked, is generally called an equivalent refractive index area. Relating to such an equivalent refractive index area, it is described in, for example, the Institute of Electronics, Information and Communication Engineers paper magazine, C Vol. J83-C No. 3 pp. 173-181 March 2000.

According to such fine structure of an equivalent refractive index area, it is considered that it has also the merits in the production as the following: while the angle dependency or wavelength dependency of the reflection prevention effect is more reduced than the conventional reflection prevention coat, simultaneously the large reflection prevention effect can be obtained, further, because the optical surface and fine structure can be simultaneously formed by the molding, the lens function and reflection prevention function can be simultaneously obtained, and eliminating the need for after-processing such as the conventional coat processing after molding. Further, when the fine structure of such an equivalent refractive index area is arranged in such a manner that it has the directionality to the optical surface, the strong optical anisotropy can be made so that the optical surface has it, and the double refraction optical element which is conventionally produced by cutting the crystal such as a quartz can be obtained by the molding. When it is combined with the refraction optical element or reflection optical element, a new optical function can be added. The optical anisotropy in this case is called the structure double refraction.

Between the above-described scalar area and equivalent refractive index area, there is a resonance area in which the diffraction efficiency is suddenly changed due to a slight difference of the incident condition. For example, when a diffraction groove width is reduced, a phenomenon (anomaly) in which the diffraction efficiency is suddenly reduced at about several times of the wavelength, further, is increased, is generated. The same effect as the ordinary interference filter, as the guide wave mode resonance lattice filter by which only a specific wavelength is reflected, when such a diffraction groove width is adjusted, can be realized by more reducing the angle dependency.

In this connection, when an optical element is formed by utilizing the scalar area, equivalent refractive index area, or resonance area, it is necessary that fine protrusions (or hollows) are formed on the optical surface. When the optical element having such fine protrusions (hollows) is mass-produced, generally, it is appropriate that the molding is conducted by using the plastic as the raw material, but in such a case, it is necessary that the optical molding surface provided with the hollow (or protrusion) corresponding to the fine protrusion (or hollow) is provided on the molding die.

However, relating to the above-described protrusion (or hollow) of the equivalent refraction area or resonance area, it is necessary that the protrusion (or hollow) is formed at an interval of several tens to several hundreds nm, and it is very difficult to obtain by mechanical processing including the cutting processing, and in fact a practical molding die has not yet been produced. In addition, there is also a problem in which the re-use of the conventional molding die is difficult.

SUMMARY OF THE INVENTION

In view of such conventional problems, the present invention is attained, and according to an idea which is quite different from the conventional one, an object of the present invention is to provide a molding die for an optical element which is excellent in the cutting property, and by which the dimensional accuracy can be increased, and the shape of a desired optical surface can be transfer-formed. Further, the first object of the present invention is to provide a molding die for an optical element by which the fine shape can be transfer-formed, an optical element formed by using it, and a master die for molding it.

The second object of the present invention is to provide an optical surface molding die by which a fine protrusion (or hollow) can be easily formed on the optical surface of the optical element, the optical element provided with such optical surface, and the master die to form a lens and the optical surface molding die.

The first object can be attained by the following structures.

A molding die for an optical element of an embodiment consistent with the invention is a molding die for an optical element to mold the optical element, and because it is formed when the shaving processing to shave the surface used for molding an optical surface of the optical element or dimensional reference surface is conducted on the first die (die base body) formed by molding an amorphous alloy having a super-cooled liquid phase, and because the machinability of the amorphous alloy is very fine, the optical molding surface of the molding die corresponding to the optical surface of the optical element or a dimensional reference surface, or the molding dimensional reference surface can be accurately finished, and further, the life of a tool can be extended. In this connection, the dimensional reference surface is, for example, a flange portion peripheral surface of the optical element, when the optical element is attached to another member, the surface which is the reference for positioning.

Herein, the amorphous alloy (also called amorphous-like alloy) having the super-cooled liquid phase will be described below. The amorphous alloy having the super-cooled liquid phase is also called a metallic glass, and the amorphous alloy which becomes, when it is heated, the super-cooled liquid. This is because, while the ordinary metal is a poly-crystal composition, the composition is amorphous and is microscopically uniform. The mechanical strength or normal temperature chemical resistance is excellent, and the amorphous alloy has the glass transposition, and when it is heated at the temperature of about the glass transposition +50-200° C. (this is called super-cooled liquid phase), because it is softened, it has the characteristic on which the press molding processing can be carried out, and which is the characteristic that the ordinary metal does not have.

Conventionally, a technology that the molding die is formed by this heating press molding of the metallic glass, is described in Japanese Tokkaihei No. 10-217257, and the optical element having a ridgeline is described in Japanese Tokkaihei No. 9-286627. Further, an example that the metallic glass is press molded and the molding die parts having the optical molding surface are formed, is described in [Study for the accurate • fine processing of the metallic glass] of the Japan society of mechanical engineers paper magazine, vol. 65, no. 633, pages 346-352. In this example, the accuracy of the shape of a transfer optical surface (optical molding surface) formed by the press molding is made to be 500 nm, and the surface roughness is made to be 90 nm.

Herein, the present inventor has an eye to the amorphous structure of the metallic glass, and it is found that, when the super-precision cutting work by the diamond tool is directly conducted on the metallic glass, the highly accurate optical mirror surface is easily obtained. It is found that the reason is that, because the material is amorphous and has no crystal grain boundary, the machinability is uniform not depending on the position, and because the crystallization energy is increased to maintain to be amorphous, and it is made to be systematically poly-crystal body, the dispersion wear of the diamond in the cutting is small and the life of the tool edge of the tool can be maintained long. The same can be also said for the cutting work using the diamond tool.

Particularly, in an example onto which the present invention is applied, the optical surface formation of the optical element by only the conventional heat press molding is not conducted, but the metallic glass is processed in such a manner that initially, after the blank (first die) which is very close to the near net shape, that is, the finished shape, is produced by the heat press molding, the optical surface of the optical element or the surfaces corresponding to other engaging surfaces, is cutting worked by the diamond cutting by the super-precision processing machine, and it is finished to the second die.

When the molding is conducted by such method, it may be conducted so that a parting line remains on the optical molding surface of the molded molding die for the optical element by using a split mold, or there may be a draft. It may be easily removed by the finishing processing such as the cutting works. Further, after the surface, which is the reference, is processed on the first die formed by the heating press molding, it is attached onto a processing machine, on the basis of the surface, so that the eccentricity is minimized, and when the surface (called optical molding surface) corresponding to the optical surface is diamond-cutting worked by the super precision processing machine, the highly accurate optical molding surface having a small eccentricity can be easily formed. According to this method, when the dimensional accuracy of the first die is molded larger than the final finishing dimension by about 5-10 µm, the processing machining allowance by the finishing processing is about 1/10 of the conventional one. Accordingly, the molding die for the optical element according to the present invention can be said that it can be very effectively produced in a large amount.

Because carrying out the chemical galvanizing processing as in the conventional molding die is not necessary, this eliminates galvanizing thickness as a consideration for the blank dimension, the blank production process up to the optical molding surface processing, is very simple, and also the delivery date can be made shorter than ¼ of the conventional one. Further, the optical molding surface can be cutting worked again in many times, and when it is not necessary, because it can be made another shaped die material by the heating press molding, it becomes semipermanent as the material life.

On the one hand, when the present invention is observed at another angle, the following things can be considered. The present inventor can list the followings as a point at which the metallic glass is fundamentally different from the molding such as plastic: because it is the metallic material, the heat conductivity is very high, and the whole is instantaneously brought into solidification, and the cooling contraction is small and it is generated proportionally not depending on the molding position, and the reactivity to the die is low, and therefore, the present inventor comes to mind that, when the molding pressure or molding time is optimized, it can be transferred with the good reproducibility, with the same grade as the optical surface obtained by the plastic molding, or the more highly accurate grade.

Accordingly, as the molding die of the optical element having the fine protrusion (or hollow) on the optical surface, when it is molding-transferred from any master, thereby, such molding die for the optical element made of the amorphous alloy is obtained, it can be realized that the molding die whose accuracy of the shape is higher than the optical element such as the plastic which is the final molding article, can be easily obtained in a large amount. To the first die having the highly accurate optical molding surface molded in such a manner, when the parting line generated in the molding is removed by the mechanical processing, the highly accurate molding die for the optical element can be obtained. In this connection, the master necessary for molding the molding die for the optical element can be obtained in such a manner that the resist is coated by a spin coat method on the surface corresponding to the optical surface of the optical element, and after the fine pattern is exposed by electronic beams or laser beams, it is obtained when the fine pattern on the optical surface is made into the shape by the development.

That is, in the molding die for the optical element of the present invention, even in the processing of the optical molding surface having the fine shape which takes the longer time than 3 times compared with the conventional optical molding surface, the first die which is the near net shape, can be easily produced, and the number of the cutting cycles of the optical molding surface is largely reduced and the processing efficiency can be increased. However, the scope of the present invention is not limited to the molding die for optical element on which the fine optical pattern (optical molding surface having the fine shape) is formed. Further, it does not depend on also the diamond tool shape to be used, or the cutting condition. Further, another side surface of the present invention is placed under the category of the highly accurate molding die for the optical element, wherein, according to the knowledge which is newly found by the inventor in which, in the amorphous alloy which is the metallic glass, the highly accurate optical surface is obtained by the diamond cutting, the formation of the optical molding surface or the formation of the dimension reference surface is conducted on the first die obtained by molding, by the diamond cutting, and the second die is formed.

The kind of amorphous alloy which can be used for the molding die for the optical element of the present invention does not matter. Although the well known metallic glass such as Pd series, Mg series, Ti series, Fe series, or Zr series, can be used, the necessary matter for the present invention is the amorphous alloy materials having the super-cooled liquid phase, and is without reference to these compositions or kinds. However, as the molding die material for the plastic optical element molding, because the resin temperature is near about 300° C., Pd series, Ti series, or Fe series is advantageous because the glass transition point is high, and more preferably, Pd series is advantageous also from the points that Pd series is not almost oxidized in the air, and can be heat pressed, and the large bulk shape can be made. In this case, Pd (palladium) is a precious metal and high cost, however, because the molding die of the metallic glass produced by the method of the present invention can be recycled by melting down when it is unnecessary, when the short delivery date and low processing man-hour are added to it, the molding die cost for a long period of time can be more reduced than the conventional molding die cost.

In the molding die for the optical element consistent with the invention consistent with the invention, when the first die is formed by heat-softening the amorphous alloy having the super-cooled liquid phase and by press-molding it, even when the finishing shape is the complicated shape, the near net shape very close to it can be easily formed.

The molding die for the optical element consistent with the invention consistent with the invention can conduct the accurate processing, when the processing to shave the surface is the cutting processing.

The molding die for the optical element consistent with the invention consistent with the invention can conduct the accurate processing, when the processing to shave the surface is the grinding processing.

The molding die for the optical element consistent with the invention consistent with the invention can conduct the highly accurate processing and can extend the life of the diamond tool very long, and the production cost can also be reduced, when the processing to shave the surface is conducted by using the diamond tool.

The molding die for the optical element consistent with the invention consistent with the invention is a molding die for an optical element to mold the optical element, and on the first die formed by molding the amorphous alloy having the super-cooled liquid phase, because the optical molding surface used for molding the optical surface of the optical element or the dimension reference surface is formed by conducting the exposure developing processing, for example, the fine hollow (or protrusion) whose formation is impossible by the cutting processing, can be formed on the surface by the above-described processing, and when the fine protrusion (or hollow) is formed on the optical surface of the optical element molded thereby, a multi-function optical element can be molded. In this connection, herein, an optical molding surface including both of a protrusion and a hollow is also, of course, under the category of the present invention.

Further, the present inventor thinks out a method by which the optical surface having the fine shape such as the diffraction optical element is directly formed on the optical molding surface of the molding die. When its example is shown here, the resist is directly coated in the thickness of 0.1-3 μm by the spin coat on the optical molding surface of the first die molded into the aspherical surface shape, and developed by directly drawing by the electronic beam or laser beam, and after the fine optical pattern of the resist is formed on the optical surface, the fine shape such as the protrusion or hollow corresponding to the diffraction groove of the diffraction ring band is formed on the optical molding surface by the dry etching, and the molding die for the optical element is obtained.

Because the metallic glass, as described above, basically, is amorphous-like and the whole body is uniform, and has no crystal grain boundary, even in any position, it is the material having quite no directionality of a single composition. That is, in the dry etching, for example, as the mono crystal silicon, the etching is not selectively advanced in the crystal orientation, but the etching is uniformly advanced according to conditions. Accordingly, when the fine optical pattern is formed in the thickness of the resist on the surface of the amorphous alloy, and by accelerating from one direction the ion or electrolytic dissociated gas component, it is irradiated onto the resist surface, the etching is advanced in the irradiation direction in almost proportional to its thickness.

Because the amorphous alloy is the conductor, and when the charged particle is accelerated by the exposing or ion etching and crashed into the surface, the electric field can be easily formed, such a process to provide the conductive film on the resist surface as in the quartz base material, is unnecessary, and it is convenient.

Further, the etching by such charged particle is already brought into practical use as the purpose of use to sharply process the tip of the diamond, and because the apparatus is also very simple structure by which the rear gas is electrolytic dissociated and ionized, and the electric field is applied onto it, thereby, it is accelerated and crushed, it is not necessary that the special equipment is developed for realizing the present invention. In the present invention, the kind of the charged particle used for the dry etching as an example of the exposing • developing processing also is not specifically limited. It is also under the category of the present invention that the fine shape formed by the resist is dry-etched, by irradiating the charged particle on the optical molding surface of the molding die for the optical element using the amorphous alloy, and the highly accurate fine structured molding die for the optical element is obtained.

The method by which the resist is directly coated on the amorphous alloy which is to be the first die, and the dry-etching is conducted on it, is effective when the necessary quantity of the molding die is not large. On the one hand, the method by which the fine shaped optical pattern formed on the master die is transferred by the heating press molding, thereby, the amorphous alloy molding die is obtained, is effective when the large quantity molding dies are necessary.

Herein, the exposing·developing processing of the first, die will be more specifically described below. As a method to form the semiconductor, a method by which the photo-resist (called also resist) is coated on the silicon wafer, and the laser beam is irradiated and a predetermined pattern is drawn, is well known. By using it, it can be considered that the fine hollow (or protrusion) is formed in the first die.

That is, also on the optical molding surface such as the aspherical surface in the first die, after the photo-resist is coated by the spin coat method in the quite same manner, and the fine pattern is exposed by the electronic beam or laser beam, the fine pattern such as the hollow (or protrusion) on the optical surface is shaped by the development.

According to this method, even other than the fine hollow (or protrusion), the fine shape including an asymmetrical or an axial asymmetrical pattern or shape, whose formation by the normal mechanical processing is very difficult, can be highly accurately formed on the optical molding surface by the control of the exposure beam.

In this connection, the thickness of the photo-resist is normally about 1 μm, however, after it is sufficiently solidified by the post-baking after coating and drying, when the coating is conducted again, the photo-resist can be made thick. The exposing method is conducted in such a manner that, when the exposure amount (dose amount) of the electronic beam or laser beam is adjusted, because, in the negative type resist, the portion at which the exposure amount is large, is more solidified and remains at the developing, and in the positive type resist, reversely, the portion is eluted in the developing solution, the difference is generated in the advancement of the development depending on the exposure amount, thereby, the three-dimensional fine shape of the resist can be formed.

Because the resist is the resin, for the purpose that the resist is used as the molding transfer surface as it is, the strength or the adhesion is insufficient and poor for the practical use. Accordingly, it is necessary that this fine shape on the optical surface by the resist is transferred onto the molding die material as the master by any method. Conventionally, as one of these methods, the electro-casting is used. For example, when the stumper molding die is produced by transferring the pit pattern of the optical disk, after the optical recording pattern surface called the pit formed on the glass substrate by the resist is made to have the conductivity on the surface by the flash galvanizing of the copper, when the metallic nickel is deposited and adhered to it by applying the electric field on it in the electrolyte, the fine shape is copied.

However, as the elecro-cast material can be easily imagined from its production method, the phenomenon that, at the portion which is deposited and protruded, the electric field density is the more increased, and the galvanizing is the more advanced, is generated, therefore, the electric field distribution in the galvanizing solution is always microscopically varied, and thickness of the electro-cast material is not uniformly increased. Therefore, because a very large stress is generated in the electro-cast material, the fine shape of the surface can be accurately transferred, however, the plane shape of the basement is normally warped at the stage at which it is peeled from the master by the stress. As the above-described optical disk substrate, when the whole is the plane shape, the finishing process that the thickness of the electro-cast material is made very thin lower than 0.1 mm, and that the flatness is secured by polishing the rear surface thin after the peel from the master, is conducted, and when it is attached so as to follow the plane portion of the molding die, thereby, the plane shape is maintained in the molding die.

On the contrary, when the substrate shape is the highly accurate three-dimensional shape such as the optical molding surface of the aspherical surface, such conventional method can not be used, and there is a problem that, at the instant when it is peeled from the master after the electro-casting processing, the optical molding surface shape is distorted. Although it depends on the condition of the electro-casting, when the electro-casting is conducted in the thickness of several mms, it is necessary that the deformation of the optical molding surface of about 10 μm by the distortion is considered. In the world, it is required that the shape accuracy of the optical molding surface having the fine shape is at least not larger than 100 nm, and for the highly accurate use, not larger than 50 nm, and accordingly, it is impossible that such highly accurate optical molding surface is transferred by the electro-casting, and the molding die is obtained from the resist. Accordingly, in the optical molding surface having the fine shape by the conventional resist on the surface, even when it is transferred by the electro-casting, the fine shape can be copied, but, the optical molding surface shape is distorted and can not be used.

Accordingly, in the present invention, initially, the first die of the near net shape provided with, for example, the optical molding surface which is accurately coincided with the aspherical surface shape, or the surface which engages with the dimension reference surface (molding dimension reference surface), is molded, and further, after the resist is coated on its optical molding surface by the spin coat method, a predetermined pattern is formed by the electronic beam or laser beam, and the dry etching is conducted after that, thereby, for example, the fine hollow (or protrusion) is formed. The above-described processing is an example of the development • exposure processing, but, it is not limited to that. As the dry etching, there is the etching technology which is a chemical etching by a gas etching, ion etching, and a physical etching such as the plasma etching, and in which these are compounded. Further, there is also the technology in which the etching anisotropy of the substrate material is positively utilized for the fine shape formation.

A molding die for an optical element consistent with the invention consistent with the invention is a molding die for an optical element for molding the optical element, and when, on the first die formed by molding the amorphous alloy having the super-cooled liquid phase, the processing to cut the surface used for molding the optical surface of the optical element or the dimension reference surface is conducted, and the exposure • development processing is conducted, as compared to the molding die for the optical element of the invention, the optical molding surface on which the higher accurate or desired pattern is formed, can be formed. In this connection, for example, in the first die, it is also included in the category of the present invention that, even when the optical molding surface corresponding to the optical surface of the optical element is not accurately formed, the finishing processing by cutting the optical molding surface as a predetermined surface is conducted, or it is also included in the category of the present invention that, in the first die, when the optical molding surface corresponding to the optical surface of the optical element is accurately formed, by further conducting the exposure • development processing (or cutting processing) on the optical molding surface as a predetermined surface, the fine protrusion is formed. The same thing can also be mentioned for the surface of the die corresponding to the dimension reference surface.

In a molding die for an optical element consistent with the invention consistent with the invention, when the first die is formed when the amorphous alloy having the super-cooled liquid phase is heat-softened and press molded, even when the finishing shape is complicated shape, the near net shape very close to it can be easily formed.

In a molding die for an optical element consistent with the invention consistent with the invention, when the processing to shave the surface is cutting processing, the accurate processing can be conducted.

In a molding die for an optical element consistent with the invention consistent with the invention, when the processing to shave the surface is grinding processing, the accurate processing can be conducted.

In a molding die for an optical element consistent with the invention, when the processing to shave the surface is conducted by using the diamond tool, the highly accurate processing can be conducted, and the life of the diamond tool can be largely extended, and the production cost can also be reduced.

In a molding die for an optical element consistent with the invention, when the corresponding hollows or protrusions are formed so that a plurality of protrusions or hollows are transferred and formed on the optical surface of the optical element, even when they are fine protrusions or hollows whose interval is, for example, several tens to several hundreds nm, because they can be transferred and molded, the multi-functioned optical element can be obtained.

In a molding die for an optical element consistent with the invention, when the protrusion or hollow on the optical surface of the optical element forms the fine structure of the equivalent refractive index area, the light transmissivity of the optical element can be more enhanced. In this connection, it is preferable that the interval between the protrusions or hollows is not longer than the wavelength of the light which transmits the optical surface of the optical element.

In a molding die for an optical element consistent with the invention, when the protrusion or hollow of the optical surface of the optical element forms the fine structure generating the reflection prevention effect, the light transmissivity of the optical element can be more enhanced. In this connection, it is preferable that the interval between the protrusions or hollows is not longer than the wavelength of the light which transmits the optical surface of the optical element.

In a molding die for an optical element consistent with the invention, when the protrusion or hollow of the optical surface of the optical element forms the fine structure generating the structural double refraction, for example, the light transmissivity of the optical element can be changed to the oscillation direction of the light. In this connection, it is preferable that the interval between the protrusions or hollows is not longer than the wavelength of the light which transmits the optical surface of the optical element.

In a molding die for an optical element consistent with the invention, when the protrusion or hollow of the optical surface of the optical element forms the fine structure of the resonance area, for example, the degree of the aberration of the optical element is changed, thereby, the different function can be exhibited.

In a molding die for an optical element consistent with the invention, when the protrusion or hollow of the optical surface of the optical element has the function to adjust the aberration change by the wavelength change of the light source to irradiate the light onto the optical element, the function of the optical element can be more enhanced.

In a molding die for an optical element consistent with the invention, when the protrusion or hollow of the optical surface of the optical element has the function to adjust the aberration change by the temperature change, the function of the optical element can be more enhanced.

In a molding die for an optical element consistent with the invention, when the protrusion or hollow of the optical surface of the optical element is the diffraction ring band (ring band-like diffraction surface), for example, when the optical molding surface corresponding to the diffraction ring band of the optical element at the stage of the first die is formed, the cutting processing conventionally used for forming the diffraction ring band becomes unnecessary, thereby, the man-hour necessary for the processing, and the cost can be reduced.

In a molding die for an optical element consistent with the invention, it is preferable when the amorphous alloy having the super-cooled liquid phase has the hardness not lower than Hv 300 in the room temperature.

In a molding die for an optical element consistent with the invention, it is preferable when the amorphous alloy having the super-cooled liquid phase has the hardness not larger than 700 in Hv hardness in the room temperature.

Normally, the hardness of the metallic material is required for that it is so high to the degree satisfying the durability in the practical use such as the generation of wears or flaws due to the sliding movement with the die set molding die or cleaning of the optical molding surface, accordingly, the value more than Hv 300 is necessary. However, when the hardness is too high, the burden of the tool at the diamond cutting of the optical molding surface becomes large, thereby, because the life of the tool is reduced or the formation of the optical molding surface shape is difficult, it is simultaneously preferable that the hardness is not larger than Hv 700. The hardness of the amorphous alloy which is the metallic glass, is generally, Hv 500-600 which is almost equivalent to the conventional electroless nickel plating at the room temperature, and the tensile strength is about 2 times higher than the conventional blank steel, and also at the point of mechanical strength, it is sufficient, thereby, it can be mentioned that the amorphous alloy is the metallic material which is stronger than the conventional one. Further, because the amorphous alloy is high in the chemical durability, it is also stable for a fine amount of the corrosive gas generated at the time of molding of the plastic made optical element, and the generation of the haze on the optical surface of the optical element in the molding can also be prevented.

In a molding die for an optical element consistent with the invention, when it includes palladium in the composition of the amorphous alloy having the super-cooled liquid phase, the oxidation inhibition of the molding die for the optical element can be intended.

In a molding die for an optical element consistent with the invention, when it includes palladium in a rate which is not smaller than 30 mol % and not larger than 50 mol %, in the composition of the amorphous alloy having the super-cooled liquid phase, the amorphous alloy appropriate for the molding die for the optical element can be obtained.

In a molding die for an optical element consistent with the invention, when it includes any one of copper, nickel, phosphor, zirconium, or aluminum, at least, in the rate not smaller than 3 mol %, the amorphous alloy appropriate for the molding die for the optical element can be obtained.

When an optical element consistent, with the invention is molded by using the molding die for the optical element consistent with the invention, the highly accurate or multi-functioned optical element can be obtained at low cost.

Because the optical element consistent with the invention is formed of plastic material as the raw material, for example, the fine shape of the optical molding surface can be accurately transferred.

Because the optical element consistent with the invention is formed of the glass material as the raw material, for example, the fine shape of the optical molding surface can be accurately transferred.

When the optical element consistent with the invention is a lens, the aspherical optical surface in which the mass production is difficult by the machine work, can be easily and cheaply molded by the transferring.

In the molding die for the optical element consistent with the invention, a master die consistent with the invention is characterized in that it is used for molding the first die.

When a master die consistent with the invention is formed of the material whose hardness is not smaller than Hv 300 at 500° C., the amorphous alloy which is heated and softened, can be molded.

The material of a master die consistent with the invention is preferably quartz, due to its excellent chemical stability.

The material of a master die consistent with the invention is preferably mono-crystal silicon, due to its excellent chemical stability.

In a master die consistent with the invention, when the material of the master die includes tungsten carbide, it is formed from the powder metallurgy, and further, the amorphous alloy which is heated and softened, can be molded.

The diffraction ring band used in the present specification means the diffraction surface in which a relief formed as an almost concentric ring band around the optical axis, is provided, and the action to converge or diverge the luminous flux by the diffraction, is provided. For example, when its cross section is viewed in the plane including the optical axis, it is well known that each ring band has the saw tooth-like shape, and such shape is included. Further, the diffraction ring band is also called herein the diffraction groove.

When the present invention is applied, it has no relationship with the shape of the individual fine structures or arrangement period. Even when it has how fine structure, when it is formed for the purpose to add a new function to the optical element, its molding die (molding die for the optical element) is included in the category of the present invention. Further, as the function which is newly added, it is not limited to a function to reduce the aberration. Also a case where the aberration is intentionally increased corresponding to the characteristic of the optical system, is included in the category of the present invention, as far as it is conducted for the purpose to make finally come close to the ideal aberration.

The second object can be attained by the following structures.

An optical surface molding die consistent with the invention is an optical surface molding die for forming the optical surface of the optical element, and it has an optical molding surface to mold the optical surface of the optical element formed when the amorphous alloy having the super-cooled liquid phase is heated and softened and press molded, and because, on the optical surface of the optical element molded by the optical molding surface, the corresponding hollow or protrusion is formed on the optical molding surface so that a plurality if protrusions or hollows are transfer-formed, even when it is necessary that the protrusions or hollows are formed with the several tens or several hundreds nm, the machine work is not necessary, but, by the transfer-formation, it can be easily formed.

The present inventor comes into his mind that, as a point in which the metallic glass is basically different form the molding such as plastic, because it is a metallic material, the thermal conductivity is very high, and the whole is instantaneously solidified, and the cooling contraction is small and it is proportionally generated not depending on the molding position, and the reactivity to the die is low, can be listed, therefore, when the molding pressure or molding time is optimized, it can be transferred equivalently to or higher accurately than the optical surface obtained by the plastic molding.

Further, it is considered that the following can be realized: as the optical surface molding die having the fine protrusion (or hollow) on the optical molding surface, by being molding-transferred from any master, when such amorphous alloy-made optical surface molding die is obtained, the molding die whose shape accuracy is higher than the optical element such as the plastic which is the final molding product, can be easily obtained in a large quantity.

That is, when one master whose shape accuracy is good, exists, the optical surface molding die can be easily produced in large quantity. However, as the formation of such master, for example, the resist is coated by the spin coat method on the surface (mother optical surface) corresponding to the optical surface of the optical element, and a method by which, after the fine pattern is exposed by the electronic beam or laser beam, the fine pattern on the mother optical surface is shaped by the development, is considered. According to this method, the fine protrusion (or hollow) which is very difficult in the formation by the normal machine work, can be formed.

In an optical surface molding die consistent with the invention, because the protrusion or hollow of the optical surface of the optical element forms the fine structure in the equivalent value refractive index area, the light transmissivity of the optical element can be more enhanced. In this connection, it is preferable that the interval of the protrusions or hollows is not larger than the wavelength of the light which transmits the optical surface of the optical element.

In an optical surface molding die consistent with the invention, because the protrusion or hollow of the optical surface of the optical element forms the fine structure generating the reflection prevention effect, the light transmissivity of the optical element can be more enhanced. In this connection, it is preferable that the interval of the protrusions or hollows is not larger than the wavelength of the light which transmits the optical surface of the optical element.

In an optical surface molding die consistent with the invention, because the protrusion or hollow of the optical surface of the optical element forms the fine structure generating the structural double refraction, the light transmissivity of the optical element can be changed corresponding to the oscillation direction of the light. In this connection, it is preferable that the interval of the protrusions or hollows is not larger than the wavelength of the light which transmits the optical surface of the optical element.

In an optical surface molding die consistent with the invention, because the protrusion or hollow of the optical surface of the optical element forms the fine structure in the resonance area, for example, the degree of the aberration of the optical element is changed and the different function can be exhibited.

In an optical surface molding die consistent with the invention, because the protrusion or hollow of the optical surface of the optical element has the function to adjust the aberration change due to the wavelength change of the light source which irradiates the light onto the optical element, the function of the optical element can be more enhanced.

In an optical surface molding die consistent with the invention, because the protrusion or hollow of the optical surface of the optical element has the function to adjust the aberration change due to the temperature change, the function of the optical element can be more enhanced.

In an optical surface molding die consistent with the invention, because the protrusion or hollow of the optical surface of the optical element is the diffraction ring band (ring band-like diffraction surface), conventionally, the cutting processing used for forming the diffraction ring band is not necessary, and the cost and man-hour for the processing can be reduced.

In an optical surface molding die consistent with the invention, because the amorphous alloy having the super-cooled liquid phase has the hardness Hv not lower than 300 at the room temperature, the hardness necessary for the optical surface molding die can be secured.

In an optical surface molding die consistent with the invention, because the amorphous alloy having the super-cooled liquid phase has the hardness Hv not larger than 700 at the room temperature, the more preferable hardness as the optical surface molding die can be secured.

In an optical surface molding die consistent with the invention, when palladium is included in the composition of the amorphous alloy having the super-cooled liquid phase, the oxidation inhibition of the optical surface molding die can be intended.

In an optical surface molding die consistent with the invention, when the palladium is included at the rate of not smaller than 30 mol % and not larger than 50 mol % in the composition of the amorphous alloy having the super-cooled liquid phase, the amorphous alloy appropriate for the optical surface molding die can be obtained.

In an optical surface molding die consistent with the invention, because any one of copper, nickel, phosphor, zirconia, or alminium, is included at the rate of at least not smaller than 3 mol % in the composition of the amorphous alloy having the super-cooled liquid phase, the amorphous alloy appropriate for the optical surface molding die can be obtained.

In an optical element consistent with the invention, because it is molded by using the optical surface molding die consistent with the invention, a predetermined function can be exhibited by the protrusion or hollow which is transfer-formed.

In a lens consistent with the invention, because it has the optical surface on which a plurality of protrusions or hollows are formed at the interval at least smaller than the wavelength of the light which transmits the optical surface, the light transmissivity of the optical surface can be more enhanced.

In a lens consistent with the invention, because the protrusion or hollow of the optical surface forms the fine structure in the equivalent refractive index area, the light transmissivity of the optical surface can be more enhanced.

In a lens consistent with the invention, because the protrusion or hollow of the optical surface forms the fine structure generating the reflection inhibition effect, the light transmissivity of the optical surface can be more enhanced.

In a lens consistent with the invention, because the protrusion or hollow of the optical surface forms the fins structure generating the structural double refraction, the light transmissivity of the optical surface can be more enhanced.

In a lens consistent with the invention, because the protrusion or hollow of the optical surface forms the fine structure in the resonance area, for example, the degree of the aberration of the optical element is changed, and the different function can be made to exhibit.

In a lens consistent with the invention, because the optical surface is molded by the optical molding surface formed by molding the amorphous alloy having the super-cooled liquid phase, and the plurality of protrusions or hollows are transfer-formed by the hollows or protrusions formed on the optical molding surface, it can be easily mass-produced.

In an optical surface molding die consistent with the invention, because the amorphous alloy having the super-cooled liquid phase has the harness Hv not smaller than 300 at the room temperature, the harness necessary for the optical surface molding die can be secured.

In an optical surface molding die consistent with the invention, because the amorphous alloy having the super-cooled liquid phase has the harness Hv not larger than 700 at the room temperature, the more preferable hardness as the optical surface molding die can be secured.

In an optical surface molding die consistent with the invention, when palladium is included in the composition of the amorphous alloy having the super-cooled liquid phase, the oxidation inhibition of the optical surface molding die can be intended.

In an optical surface molding die consistent with the invention, when palladium is included at the rate of not smaller than 30 mol % and not larger than 50 mol % in the composition of the amorphous alloy having the super-cooled liquid phase, the amorphous alloy appropriate for the optical surface molding die can be obtained.

In an optical surface molding die consistent with the invention, because any one of copper, nickel, phosphor, zirconia, or aluminum is included at least at the rate of not smaller than 3 mol % in the composition of the amorphous alloy having the super-cooled liquid phase, the amorphous alloy appropriate for the optical surface molding die can be obtained.

In a lens consistent with the invention, because the plastic material is the raw material, for example, the fine shape of the optical molding surface can be accurately transferred.

In a lens consistent with the invention, because the glass material is the raw material, for example, the fine shape of the optical molding surface can be accurately transferred.

A master die consistent with the invention is a master die used for molding the optical surface molding die consistent with the invention, the master die is characterized in that the protrusion or hollow is formed by conducting the exposure developing processing onto the mother optical surface corresponding to the optical surface of the optical element.

Conventionally, to form the molding die of the optical element by using the electro-casting in which the stress-strain is large, or the substrate material itself does not come into the practical use. In contrast to this, relating to a method by which the fine shape is formed on the optical surface by conducting the exposure development by using the resist, the present inventor calls to mind a forming method of a new optical surface molding die in which the metallic glass having the high molding durability is used. That is, in advance, by the grinding processing or the diamond cutting processing, the resist coated on the master die formation-worked on the mother optical surface such as the aspherical surface shape is dry etched after the exposure-development, and the fine resist shape is directly formed on the base material, and the master die is made, and when the amorphous alloy which is the metallic glass, is heated-softened and press-molded, the mother optical surface having the fine shape is molding-transferred onto the optical surface molding die.

Because the metallic glass can sufficiently transfer the fine shape of the master die by about several kg/cm$^2$ by the heating-softening, it is rear that the metallic glass destroys the master die by the heating press molding. Further, because the hardness of the base material is larger than that of the metallic glass, the metallic glass hardly damages the mother optical surface of the master die having the fine shape. Accordingly, in the heating press molding of the metallic glass, being different from the case of normal injection molding, the material such as a mono crystal silicon or quartz on which the dry etching is easily conducted, can preferably be applied. Further, also the powder sinter material of the tungsten carbide series such as the super hard metal, when the structural grain is smaller than the fine shape on the mother optical surface, it can be used as the master die. Because the shape which is copied from the base material by the heating press molding in this manner has no large internal stress in the metallic glass, the reproduce property is very good, thereby, the optical molding surface of almost the same shape metallic glass-made molding die can be obtained in a large quantity. When the optical molding surface having the fine shape which is, in this manner, conventionally, only experimentally produced individually, but, which can not be realized as the molding die, is transferred by the heating press molding by utilizing the nature of the metallic glass, a method by which the highly accurate optical surface molding die which can mold the fine optical pattern on the optical surface of the optical element is obtained, is the category of the present invention. In the present invention, the kind of base material is not matter.

A master die consistent with the invention can mold the amorphous alloy heated and softened when it is formed by the material whose hardness is not smaller than Hv 300 at 500° C.

In a master die consistent with the invention, its material is preferably quartz, because of its excellent chemical stability.

¥In a master die consistent with the invention, its material is preferably a mono crystal silicon, because of its excellent chemical stability.

A master die consistent with the invention can, when the material of the master die includes the tungsten carbide, be formed from the powder sinter, and can form the heated and softened amorphous alloy.

BRIEF DESCRIPTION OF THE DRAWINGS

FIGS. 1(a) to 1(c) each is a view showing a production process of a molding die for an optical element of the first embodiment to attain the first object.

DETAILED DESCRIPTION OF THE PREFERRED EMBODIMENT

Figure 2:
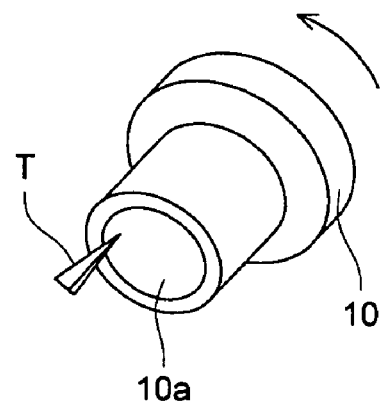
FIG. 2 is a view showing a condition of machine-working a first die 10.

Referring to the drawings, the embodiment to attain the first object of the present invention will be described below. FIG. 1 is a view showing a production process to produce a molding die for an optical element. Initially, as shown in FIG. 1(a), a support 5 is attached onto a master die material 1 formed a mother aspherical surface 1a corresponding to the aspherical surface of a lens which is an example of the optical element, and a cylindrical blank die 2 is assembled by using a bolt 3. Further, as shown in FIG. 1(b), the master die and the blank die 2 is preliminarily heated by a heater H, and the amorphous alloy MG which is heated and softened between super-cooled liquid phases, is inserted into the blank die 2 suppressing the quick solidification, and pressed by a plunger 6. In this case, the air in the blank die 2 flows out to the outside through an air vent (groove 2a formed on the end surface of the blank die 2). Because the amorphous alloy MG has the flexibility in the same manner as the melt resin, even when the application pressure is a slight, it deforms so as to coincide with the internal shape of the blank die 2, and further, it deforms so as to coincide with the shape of the mother aspherical surface 1a of the master die material 1. That is, the optical transfer surface (surface 10a which will be described later) corresponding to the mother aspherical surface 1a of the master die material 1 is formed into the shape of aspherical surface. When the amorphous alloy MG is molded by softening, the wear and tear of a master die 4 (the master die 1 and blank die 2) are suppressed, and its life can be extended.

Further, as shown in FIG. 1(c), when the master die 4 and the plunger 6 are integrally immersed in the vessel 7 in which the cooling water is filled, the amorphous alloy MG is quickly cooled. In this connection, such cooling may be the natural slow cooling. After that, when the master die 4 and the plunger 6 taken out of the vessel 7 are separated, and the solidified amorphous alloy Mg is taken out, the first die 10 (FIG. 2) is formed. In this connection, in the finishing processing of the flange outer peripheral surface of the amorphous alloy after the molding, after the tilt is corrected on the basis of the tilt reference surface (corresponding to 10b in FIG. 4) of the master die material 1, when the optical transfer surface 10a is rotated, and is adjusted according to its eccentric amount, the removal of the eccentric amount of the optical transfer surface 10a can be conducted by the machine work.

FIG. 2 is a view showing a condition that the first die 10 is machine-worked. In FIG. 2, while the first die 10 is rotated by a drive body, not shown, the optical transfer surface 10a is cutting processed by a diamond tool T, and the second die, that is, the molding die for the optical element 10' (FIG. 3) is formed. By such cutting processing, for example, the groove corresponding to the diffraction ring band of the lens, which is the final product, is formed, and the optical molding surface 10a' can be obtained. Further, the processing of the flange peripheral surface provided on the periphery of the optical surface of the lens to conduct the deletion of a parting line or the eccentricity adjustment, can also be conducted. It is not limited to the cutting processing by using the diamond tool, but, it may also be the grinding processing by using a diamond grind stone.

Figure 3:
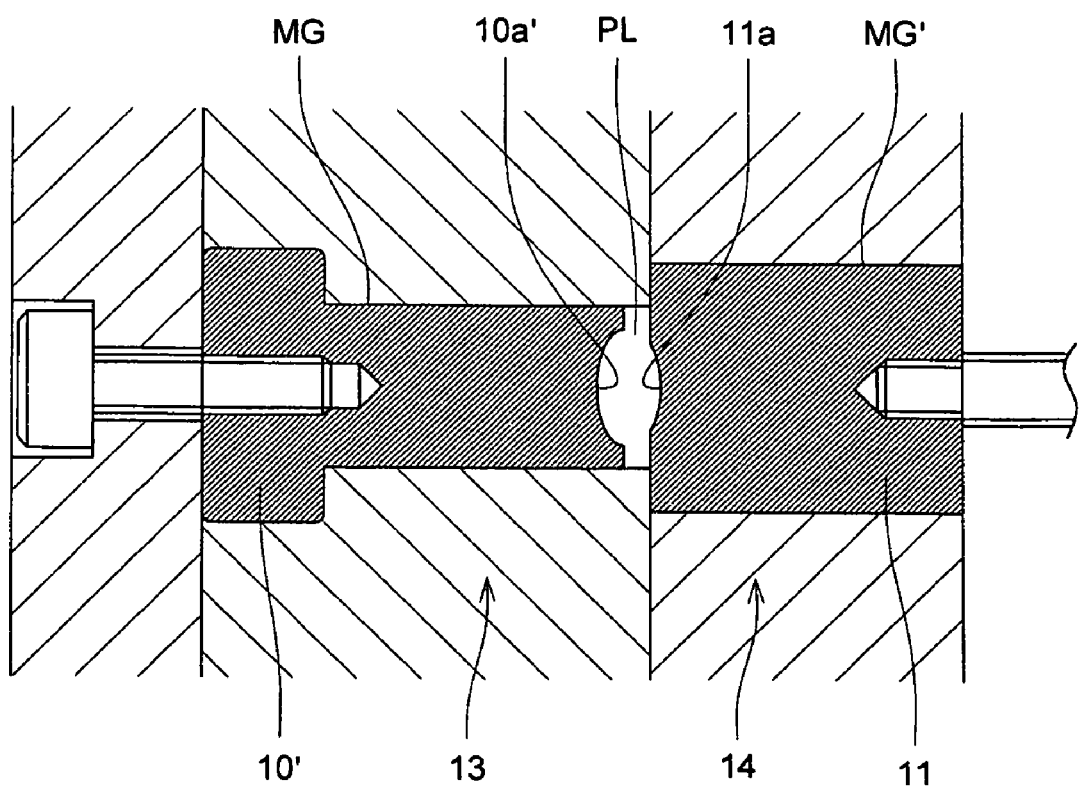
FIG. 3 is a sectional view showing a molding die to form a lens which is an optical element.

FIG. 3 is a sectional view showing a molding die for molding a lens which is an optical element. In the above-described manner, when the molding die for the optical element 10' which is formed from the amorphous alloy MG, and the molding die for the optical element 11 formed in the same manner, are respectively inserted in die set molding dies 13, 14 so that the optical molding surfaces 10a' and 11a' are opposite to each other, and melted plastic material PL is injected between the molding dies for the optical element 10' and 11, and further cooled down, a desired shaped lens can be obtained.

Figure 4:
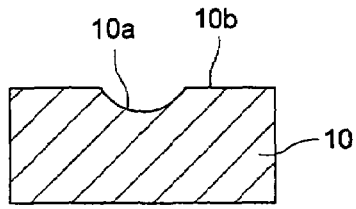
FIGS. 4(a) to 4(d) each is a view showing a production process of the molding die for the optical element of the second embodiment.
Figure 4:
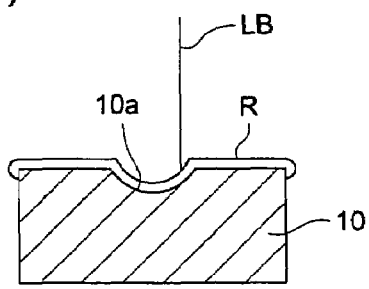
Figure 4:
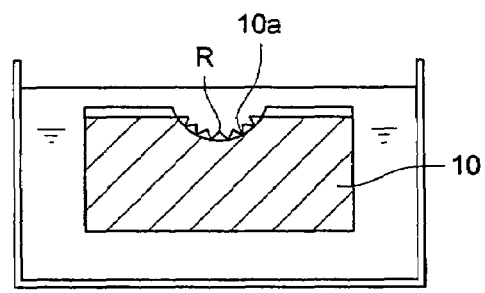
Figure 4:
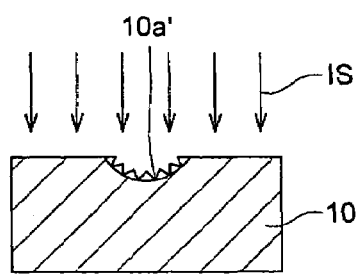

Further, the second embodiment of the present invention will be described below. FIG. 4 is a view showing the process by which the exposure • development processing is conducted on the first die 10 molded from the amorphous alloy. It is presumed that, previously, the optical transfer surface 10a of the first die 10 is made in such a manner that the aspherical surface shape is accurately transferred from the master die material in the molding process shown in FIG. 2 (FIG. 4(a)).

In succession to it, as shown in FIG. 4(b), while the first die 10 is rotated around the optical axis by the drive body, not shown, the resist R is coated on the optical transfer surface 10a (spin coat). The resist R is coated with the uniform film thickness on the whole upper surface of the first die 10 including the optical transfer surface 10a.

Further, on the optical transfer surface 10a on which the resist R is coated, the electronic beam LB is irradiated by an exposure equipment, not shown, and the fine pattern is exposure-formed. Succeedingly, as shown in FIG. 4(c), the first die 10 is soaked in the solution, and on the optical transfer surface 10a, the resist R is removed corresponding to the exposure-formed fine pattern. Herein, because the beam diameter of the electronic beam LB is very small, the resist R can be removed at the interval of several ten to several hundred nm.

After that, as shown in FIG. 4(d), the upper surface of the first die 10 from which the resist R is partially removed, is exposed in the atmosphere (dry etching) of the ion shower IS (accelerated argon ion), and the surface of the first die 10 is removed corresponding to the pattern of the resist R. At this time, in the remained portion of the resist R, because the surface is not removed, when the resist R is removed by the many fine circle shape at the time of the exposure, on the surface of the optical transfer surface 10a of the first die 10, many small cylindrical hollows are formed, and the second die provided with the optical molding surface 10a', that is, molding die for the optical element 10' can be formed. Further, when the exposure amount of the electronic beam 'dose amount) is adjusted, the conical hollow or hollow corresponding to the saw-toothed ring band can be arbitrarily formed.

By using the molding die for the optical element formed as described above, the optical element (lens) can be formed as shown in FIG. 3. In this connection, on the second die 10' formed as shown in FIG. 4, the cutting processing as shown in FIG. 2 can be further conducted, or after the cutting processing shown in FIG. 2, the exposure • development processing as shown in FIG. 4 may be conducted.

FIG. 5 is a partially sectional perspective view showing by enlarging the optical surface of a lens formed by such molding die for the optical element. In FIG. 5(a), as an example of a plurality of protrusions, it is a structure (an example of the fine structure of the equivalent refractive index area) in which many fine cylinders C are formed matrix-like on the optical surface of the lens. For example, when such lens is used for the objective lens of the optical pick-up apparatus for the DVD record/reproduce, the light which transmits the lens is in the vicinity of 650 nm. Therefore, when the interval Δ of the fine cylinders C is 160 nm, the light incident on such objective lens is hardly reflected, and the lens having the very high light transmissivity can be provided.

Figure 5A:
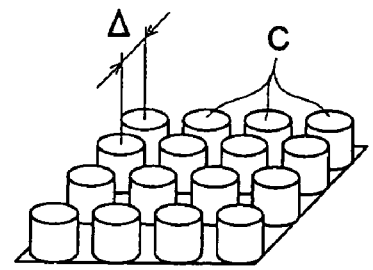
FIGS. 5(a) to 5(d) each is a partial section perspective view showing by enlarging the optical surface of the lens formed by the molding die for the optical element.
Figure 5B:
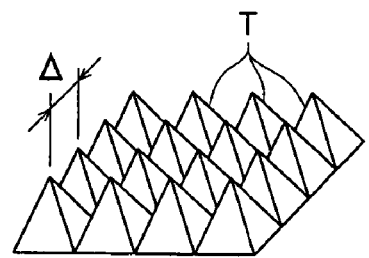
Figure 5C:
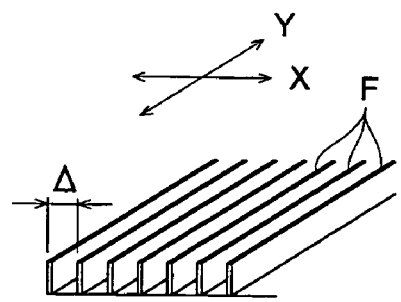
Figure 5D:
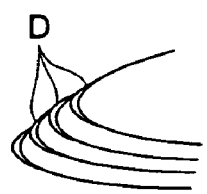

In FIG. 5(b), on the optical surface of the lens, as an example of a plurality of protrusions, many fine triangle cone T separated with an interval Δ are formed, and it has the same remarkable effect as in FIG. 5(a). As this interval Δ, when it is not larger than 0.1-0.2 μm, it is preferable because the scattering is lowered. In FIG. 5(c), on the optical surface of the lens, as an example of a plurality of protrusions, many fins F separated with the interval Δ (an example of the fine structure of the structure double refraction) are formed. The length of fins F is longer than the transmitting light wavelength (in the above-described example, not smaller than 650 nm). The lens having such structure transmits the light having the oscillation surface in the direction along the fin F, however, the polarized light effect by which the light in the crossing direction with the fin F is not transmitted, is attained. In FIG. 5(b), on the optical surface of the lens, as an example of the continuous plurality of protrusions, the diffraction ring band D is formed. Relating to the diffraction ring band D, for example, in Japanese Tokkai No. 2001-195769, because the chromatic aberration correction and temperature correction are detailed, the following description is neglected. Further, in FIGS. 5(a) to 5(c), although, for the simplification, on the plane, views on which these protrusions are provided are shown, it may also be allowable that its bottom surface is made a curved surface having an appropriate curvature such as the spherical surface or aspherical surface, and protrusions are provided on its curved surface.

As an example of the amorphous alloy MG, the metallic glass having the following composition can be used.

$Pd_{40}Ni_{10}Cu_{30}P_{20}$, $Zr_{55}Cu_{30}Al_{10}Ni_5$, $Pd_{53}Cu_{28}Ni_{10}P_9$, $Pd_{76}Cu_{17}Si_7$.

In the following embodiment, the metallic glass is the amorphous alloy having the super-cooled liquid phase.

EXAMPLE 1

A case where 10 molding dies for lens molding having the aspherical optical molding surface on the cylindrical end surface whose diameter is 7 mm and whose length is 35 mm are produced by conducting the conventional chemical plating, and a case where, after the first die molding according to the present invention, the processing finishing is conducted, are compared to each other. The former is conducted in such a manner that, after 50 μm first die, which is rather small, is cut by the normal lathe, the electroless nickel plating is conducted by 100 μm, and the outer periphery and the optical molding surface are cut down by 50 μm by the diamond cutting by the super-precision lathe, and finished into a regulated dimension and the second die is obtained. The time needed in this case is 2 hours in the first die processing, 20 hours in the electroless nickel plating, and 10 hours in diamond cutting processing, and the total is 32 hours. On the one hand, the molding die according to the present invention is formed in such a manner that the master die is produced by a general purpose lathe, and the first die is produced by heat-softening the metallic glass material $Pd_{40}Ni_{10}Cu_{30}P_{20}$ in the air, and by press molding, and 10 μm is cut down by the same diamond cutting by the super-precision lathe as the conventional method, and it is finished into a regulated dimension, thereby, the second die is formed. The time necessary in this case is 2 hours in the master die production, 1 hour in the heat press molding, and 4 hours in the diamond cutting processing, and the total is 7 hours. As the processing efficiency, it can be found that the molding die of the present invention is about 5 times higher. The hardness Hv of the metallic glass is 576.

EXAMPLE 2

As the molding die for optical element of the 5 mm diameter having the protrusion (step difference) corresponding to the diffraction ring band, with the molding die blank on which the conventional 100 μm electroless nickel plating is conducted, and the first die in which the. $Zr_{55}Cu_{30}Al_{10}Ni_5$ series metallic glass is near net shape molded in the nitrogen atmosphere, the optical molding surface is obtained by the cutting processing by the super-precision lathe. As the diamond tool, a sword tip bite (straight cutting tool) whose radius of the blade tip is 0.5 μm is used. The interval of protrusions is the minimum 9 μm, and the number of protrusions is 28. Because the blade is vary small and sharp, in order to prevent the breakage by the cutting load, the cutting condition of both is made in such a manner that the cutting amount is 2 μm, and the feeding speed of the tool is 0.1 mm/min. Therefore, the time necessary for one cycle cutting is about 30 minutes for both. In the conventional molding die, because the undulation of the surface of the optical molding surface by the thick electroless nickel plating is generated by about 20 μm, as the cut-down amount, about 50 μm is necessary as described above.

Therefore, in the total of the cutting time for obtaining the optical molding surface, 13 hours are necessary. On the one hand, because the accuracy of the shape of the first molding die of the near net shape of the present invention can be made not larger than 10 µm, the total of the cutting processing time is 4 hours. In the processing efficiency of the optical molding surface having the protrusion corresponding to the diffraction groove, the molding die according to the present invention is more than 3 times higher than the conventional one. The hardness Hv of the metallic glass is 560.

EXAMPLE 3

On the master die which is a quartz bulk, the mother aspherical surface whose diameter of aspherical surface is 4.5 mm is directly forming-processed by the super-precision lathe grinding stone. In the aspherical surface shape, the coefficient of contraction of the metallic glass $Pd_{53}Cu_{28}Ni_{10}P_9$ is previously estimated to be 0.3%. The resist is conducted on the mother aspherical surface of the aspherical surface shape in the 3.0 µm thickness by repeating the spin coat, and chrome is coated on the surface so that the electric field can be formed, and it is made the conductor. The resist is exposed on the diffraction grooves in which the minimum pitch is 3 µm, step difference amount is 0.8 µm and the number of grooves is 250, by the electronic beam while the dose amount is adjusted. This is developed, and dry etching is conducted for 3c hours by the plasma CVD on the condition of fluorine carbide gas 2 m Torr, and RF power 500 W, and the groove of the blaze-like diffraction ring band whose step difference is 0.6 µm, is formed on the mother aspherical surface of the aspherical surface, and the master die is obtained. On this master die (master die material), the cylinder for molding the outer peripheral portion (blank die) is set, and the metallic glass $Pd_{40}Ni_{10}Cu_{30}P_{20}$ is heated-softened in the air, and press molded in the room temperature atmosphere, and the first die is obtained. The mold transferability of the mother aspherical surface is not larger than 100 µm, and the radius of curvature of a portion of the crest of the diffraction ring band which is originally the ridgeline, is, when observed by the SEM, not larger than 50 nm. Further, a portion of the valley of the diffraction ring band is, although there is a portion which is considered to be a chip of quartz, transferred onto the optical molding surface of the metallic glass in the accuracy not larger than the radius of curvature 50 nm. As described above, the groove pitch of the diffraction ring band is small, and the efficiency is very bad for the cutting of the diamond tool, and further, because there is a limit for processing the tool tip sharp, the shape of the valley is incorrect, therefore, even in the case where the diffraction efficiency of the molded optical element is lowered, according to the present invention, the molding die for the optical element having the optical molding surface provided with the shape of the accurate diffraction ring band by which the sufficient diffraction efficiency can be secured, can be obtained.

EXAMPLE 4

The metallic glass $Zr_{55}Cu_{30}Al_{10}Ni_5$ is produced to the first die in which the diameter is 5 mm, and the length is 35 mm, in the nitrogen atmosphere by the near net shape molding, and by the diamond cutting by the supe-precision lathe 1, the aspherical optical molding surface is formed. Further, on the optical molding surface, the resist of the thickness 1.2 µm is coated by the spin coat. By the laser beam drawing apparatus, the exposure is conducted on the groove pattern of the diffraction rig band while adjusting the irradiation amount. The resist is developed, and a protrusion corresponding to the blaze type diffraction ring band in which the minimum pitch is 5 µm, the step difference is 0.8 µm, and the number of grooves is 130, is formed. Onto this, in Ar atmosphere of $3.0\times10^{-4}$ Torr, the ion beam accelerated to 400 V is irradiated from the optical axial direction of the optical molding surface for 15 minutes, and it is dry etched and the second die is obtained. The protrusion corresponding to the blaze-like diffraction ring band whose step difference is 1.5 µm, can be formed on the optical molding surface of the metallic glass molding die for the optical element.

Figure 6:
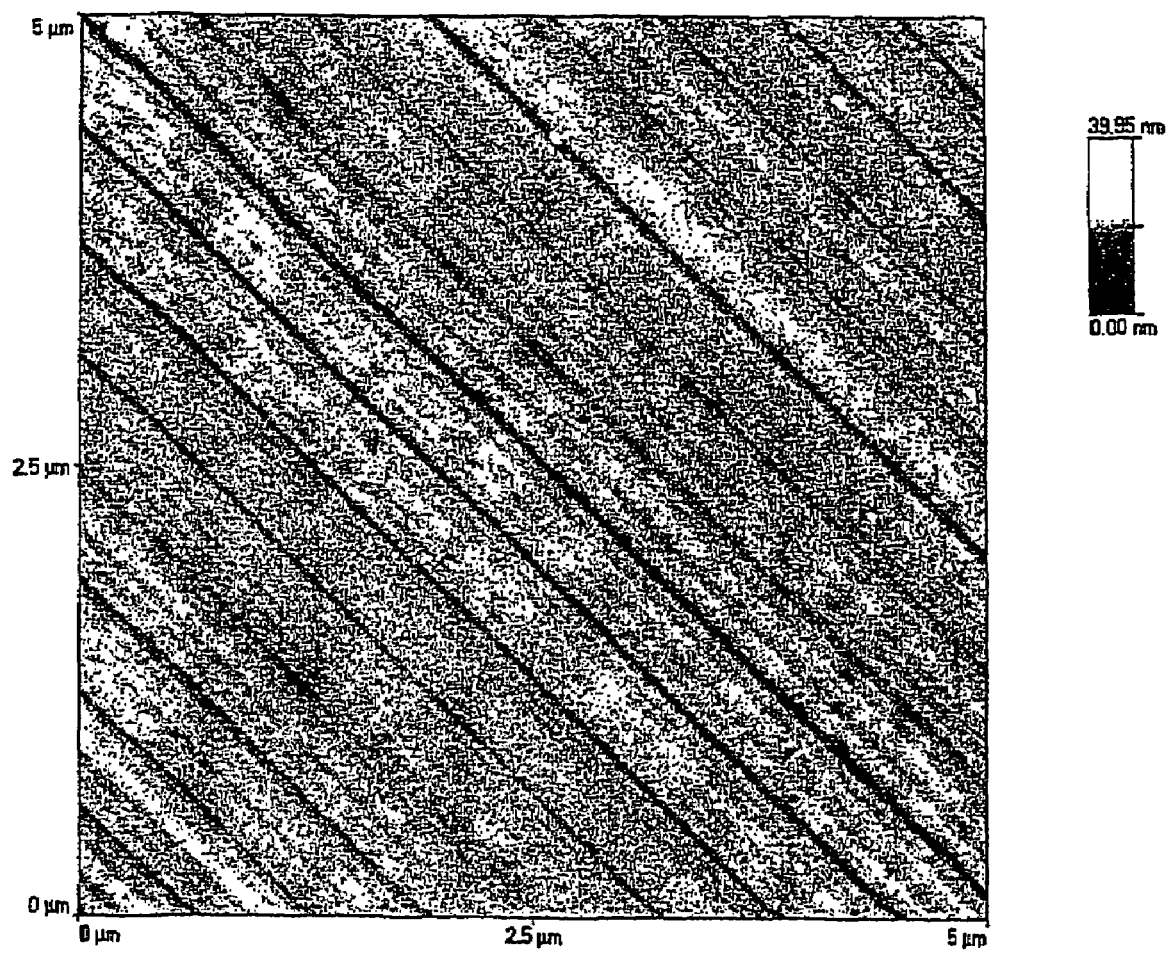
FIG. 6 is a microphotograph in which the metallic glass $Pd_{40}Ni_{10}Cu_{30}P_{20}$ is diamond-cut into the plane shape, and it is observed by a inter-atomic force microscope (AFM).

FIG. 6 is a microphotograph in which the metallic glass $Pd_{40}Ni_{10}Cu_{30}P_{20}$ is diamond cut into the plane shape and observed by the inter atomic force microscope (AFM). The cutting condition is that the blade tip of the tool is R0.5 mm, main axis rotation speed is 900 rpm, tool feed speed is 0.4 mm/min, and cut amount is 2 µm. The theoretical surface roughness in this condition is Rz 0.05 nm. The surface roughness of the cutting plane is Rtm 3.83 nm, Ra 0.61 nm, and the surface is very smooth surface without a burr and tear as shown in the drawing. The surface roughness of the aluminum alloy (S 3M) for the diamond cutting cut in the almost the same condition is R tm 4.9 nm, and Ra 0.8 nm, and the cutting surface of the metallic glass is very finer than the aluminum alloy which is said to have the good machinability.

Further, in the examples described above, the examples in which the present invention is applied on the optical surface of the optical element, are shown, and in the same manner, the present invention can be applied on the dimension itself of the optical element for which the accuracy is required, or the dimension reference surface effectively used for the reference position when the optical element is brought into contact with it and positioning is conducted.

According to the present invention, the cutting property is excellent, and the dimension accuracy can be enhanced, and the molding die for the optical element by which the shape of the desired optical surface or dimension reference surface can be transfer-formed, or the molding die for the optical element by which the fine shape can be transfer-formed, and the optical element formed by using it, and the master die for molding it can be provided.

Figure 7:
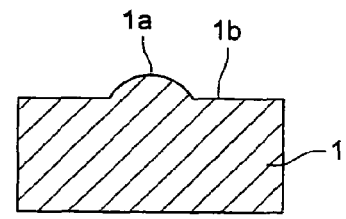
FIGS. 7(a) to 7(e) each is a view showing the production process of a master to produce an optical surface molding die to attain the second object.
Figure 7:
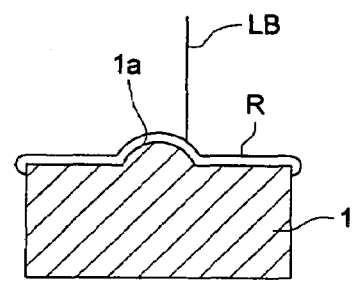
Figure 7:
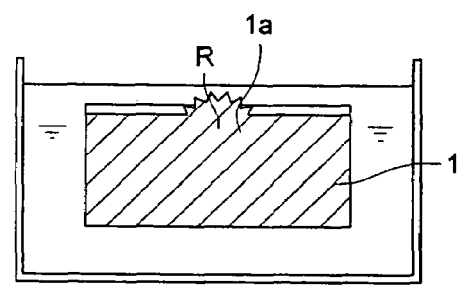
Figure 7:
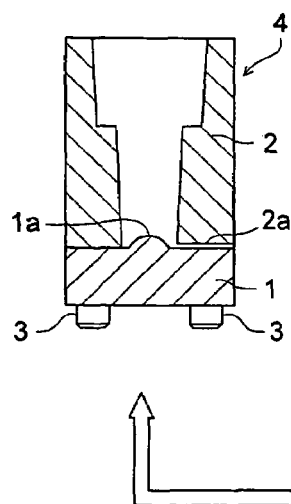
Figure 7:
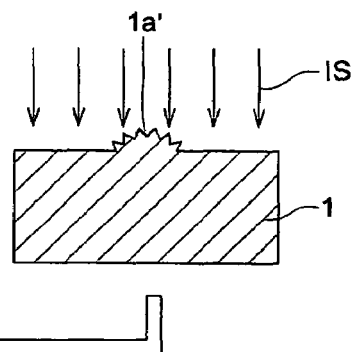

Next, referring to the drawings, the embodiment of the present invention to attain the second object will be described. FIG. 7 is a view showing the production process of the master to produce the optical surface molding die. Initially, as shown in FIG. 7(a), the mother optical surface (which is called also mother aspherical surface) 1a is formed on the master die material 1. Such mother optical surface 1a coincides with the optical surface shape of the lens (an example of the optical member) which is required to be formed from the optical surface molding die. The periphery of the mother optical surface 1a is the tilt reference plane 1b.

Succeedingly, as shown in FIG. 7(b), while the master die material 1 is rotated around the optical axis by the drive body, not shown, the resist R is coated on the mother optical surface 1a (spin coat). The resist R is coated with the equal film thickness on the upper surface of the master die material 1 including the mother optical surface 1a.

Further, the electronic beam LB is irradiated by the exposure device, not shown, onto the mother optical surface 1a on which the resist is coated, and the fine pattern is exposure-formed. Succeedingly, as shown in FIG. 7(c), the master die material 1 is immersed in the solution, and on the mother optical surface 1a, the resist R is removed corresponding to the fine pattern which is exposure-formed.

Herein, because the beam diameter of the electronic beam LB is very small, the resist R can be removed with the interval of several tens to several hundreds nm.

After that, as shown in FIG. 7(d), the upper surface of the master die material 1 from which the resist R is partially removed, is exposed in the atmosphere of the ion shower IS (accelerated argon ion) (dry etching), and the surface of the master die material 1 is removed corresponding to the pattern of the resist R. In this case, in a portion on which the resist R remains, because the surface is not removed, when the circular resist R is remained thick at the exposing time, many small cylindrical shaped protrusions are formed on the surface of the optical transfer surface 1a' of the master die material 1.

The master die material 1 formed as described above, is fixed by a bolt 3 in such a shape that one end of the cylindrical blank die 2 is closed, and the master die 4 is formed (FIG. 7(e)). A groove 2a is formed on an end surface of the blank die 2 so that an air vent is formed between the blank die 2 and the master die material 1. In this connection, in the processing of the master die material 1, the large scale instruments are necessary, and their production cost is high, however, because, when there is even only one, the large amount of the optical surface molding dies can be produced as will be described later, specifically, there is no problem.

EXAMPLE 5

The example of the present invention will be described below. The gentle aspherical surface mother optical surface whose diameter is 3 mm, and whose maximum normal angle is 5°, is formed on the quartz bulk by the cutting processing by the supe-precision processing machine, and on it, the negative type resist is coated in 0.5 μm thickness by the spin coat. The resist film thickness difference between the center of the optical surface and the outer peripheral portion is not larger than 0.1 μm. The conductive film is coated on the surface, and under the condition that the acceleration voltage is 30 keV, which is slightly low, by the electronic drawing apparatus, and the back scattering is largely generated, while the dose amount is adjusted, the conical shape of 0.5 μm diameter is exposed on the resist surface over the whole surface of the mother optical surface at pitch of 0.6 μm. After the development, the optical transfer surface on which the conical fine shape is provided on the quartz bulk surface which is a base material by the ion beam etching, is obtained. This is arranged in the cylinder as the master die, and the heat-softened metallic glass $Pd_{40}Ni_{10}Cu_{30}P_{20}$ is pressed and molded from the side to which the optical transfer surface is opposite, and the optical molding surface of the optical surface molding die is obtained. When the plastic lens is injection-molded of the optical poly-olefin series resin by using this optical molding surface, the conical shape in which the diameter is 0.3 μm and the height is 0.3 μm, is mold-transferred onto the surface of the optical surface. The reflection factor of this molded optical surface is not larger than 1% in the visible area. However, a slight scattering is visually observed.

According to the present invention, an optical surface molding die having the fine protrusion (or hollow), in which the mass production is difficult by the conventional machine work, can be easily obtained, and by using such optical surface molding die, a high functional lens can be easily obtained.

What is claimed is:

1. A method of producing a molding die for molding an optical element, comprising the steps of:
   molding a base material consisting of an amorphous alloy having a super-cooled liquid phase by softening the base material with heat and by pressing the softened base material to form a die base body;
   processing a surface of the die base body to form a reference surface on the die base body;
   attaching the die base body onto a processing machine on the basis of the reference surface; and
   shaving a part of the die base body through the use of the processing machine to form a die face corresponding to an optical surface of the optical element.

2. The producing method of claim 1, wherein the shaving step is a cutting step.

3. The method of claim 2, wherein the cutting step is performed by the processing machine and wherein the processing machine comprises a diamond cutting tool.

4. The method of claim 1, wherein the amorphous alloy has a hardness Hv of 300 or more at room temperature.

5. The method of claim 1, wherein the amorphous alloy has a hardness Hv of 700 or less at room temperature.

6. The method of claim 1, wherein the composition of the amorphous alloy comprises palladium.

7. The method of claim 6, wherein the composition of the amorphous alloy comprises palladium with a rate of 30 mol % to 50 mol %.

8. The method of claim 1, wherein the composition of the amorphous alloy comprises at least one element selected from copper, nickel, phosphor, zirconium, or aluminum, with a rate of 3 mol % or more.

* * * * *